US005555532A

United States Patent [19]
Sacha

[11] Patent Number: 5,555,532
[45] Date of Patent: Sep. 10, 1996

[54] METHOD AND APPARATUS FOR TARGET IMAGING WITH SIDELOOKING SONAR

[75] Inventor: John R. Sacha, State College, Pa.

[73] Assignee: The United States of America as represented by the Secretary of the Navy, Washington, D.C.

[21] Appl. No.: 623,285

[22] Filed: May 23, 1984

[51] Int. Cl.⁶ ............................................. G03B 42/06
[52] U.S. Cl. ........................... 367/88; 367/7; 367/11; 367/100
[58] Field of Search ................................. 367/7, 11, 88, 367/90, 100, 101, 102

[56] References Cited

U.S. PATENT DOCUMENTS

| | | | |
|---|---|---|---|
| 3,271,765 | 9/1966 | Pulford | 367/88 |
| 3,484,737 | 12/1969 | Walsh | 367/88 |
| 3,980,983 | 9/1976 | Shannon | 367/7 |
| 4,262,344 | 4/1981 | Gilmour | 367/88 |
| 4,287,578 | 9/1981 | Heyser | 367/88 |
| 4,288,866 | 9/1981 | Sackman | 367/88 |
| 4,355,311 | 10/1982 | Frosch | 367/88 |

*Primary Examiner*—Daniel T. Pihulic
*Attorney, Agent, or Firm*—Susan E. Verona

[57] ABSTRACT

A method and apparatus for imaging underwater targets utilizing sidelooking sonar. A sonar pulse consisting of a concatenated series of subpulses is transmitted. The echo return is match filtered against each of the subpulses to produce a series of range-doppler maps, each providing information in a different direction. The range-doppler maps are normalized, thresholded, and intersected, thereby yielding data points which describe the target outline. Information as to the target length, width and orientation can be computed from the target outline data.

11 Claims, 5 Drawing Sheets

LONG PURE TONE

SHORT PURE TONE

LINEAR FM UPCHIRP

LINEAR FM DOWNCHIRP

LONG PURETONE & SHORT PURETONE

SUPERPOSITION OF ALL FOUR SIGNALS

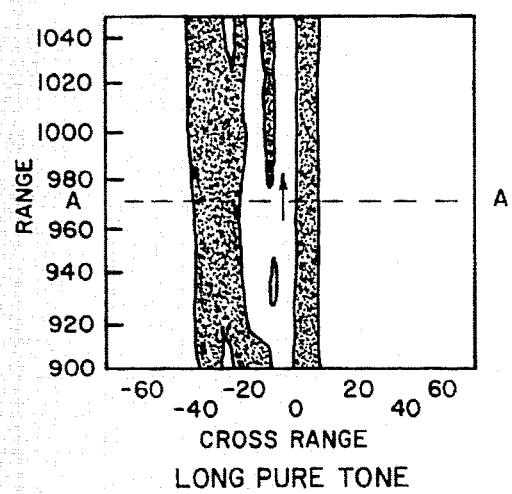
FIG. 4A — LONG PURE TONE
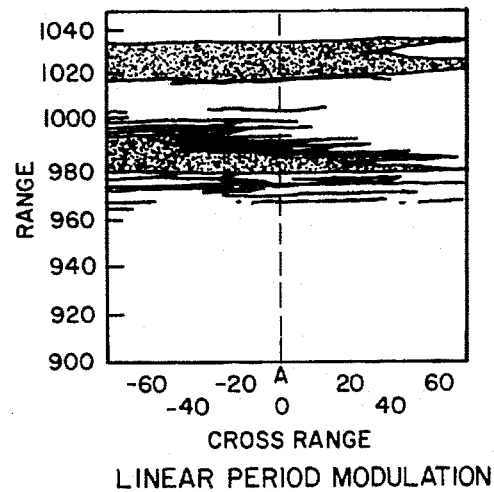
FIG. 4B — LINEAR PERIOD MODULATION
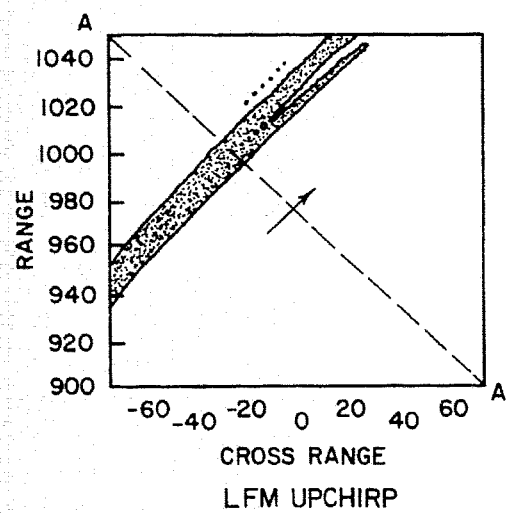
FIG. 4C — LFM UPCHIRP
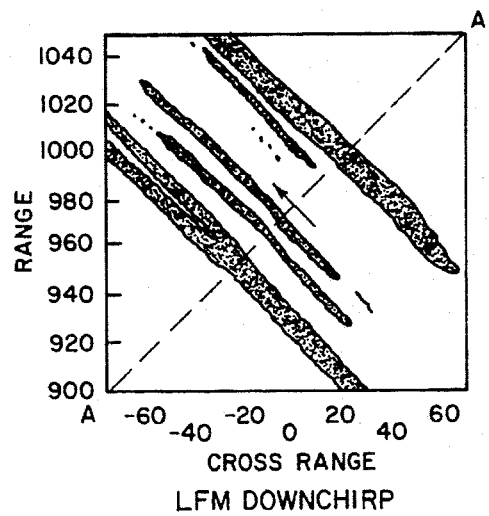
FIG. 4D — LFM DOWNCHIRP

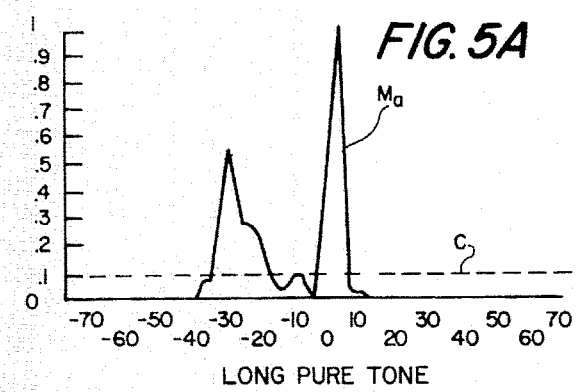
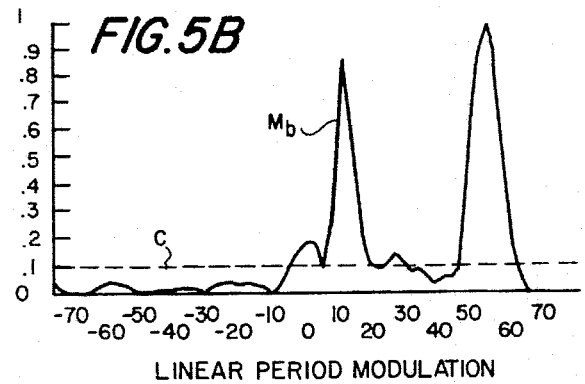
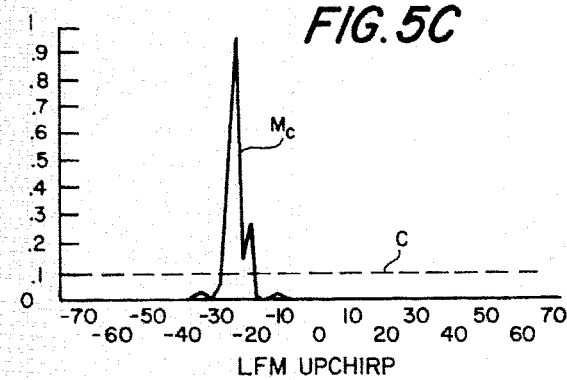
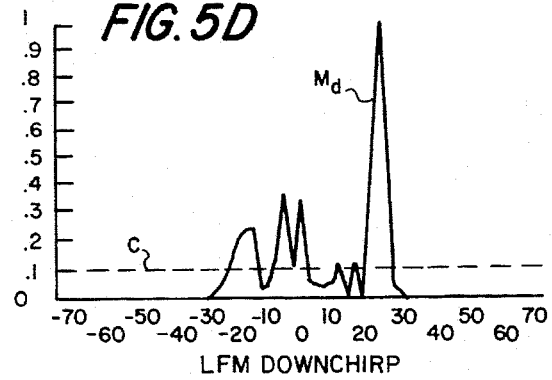
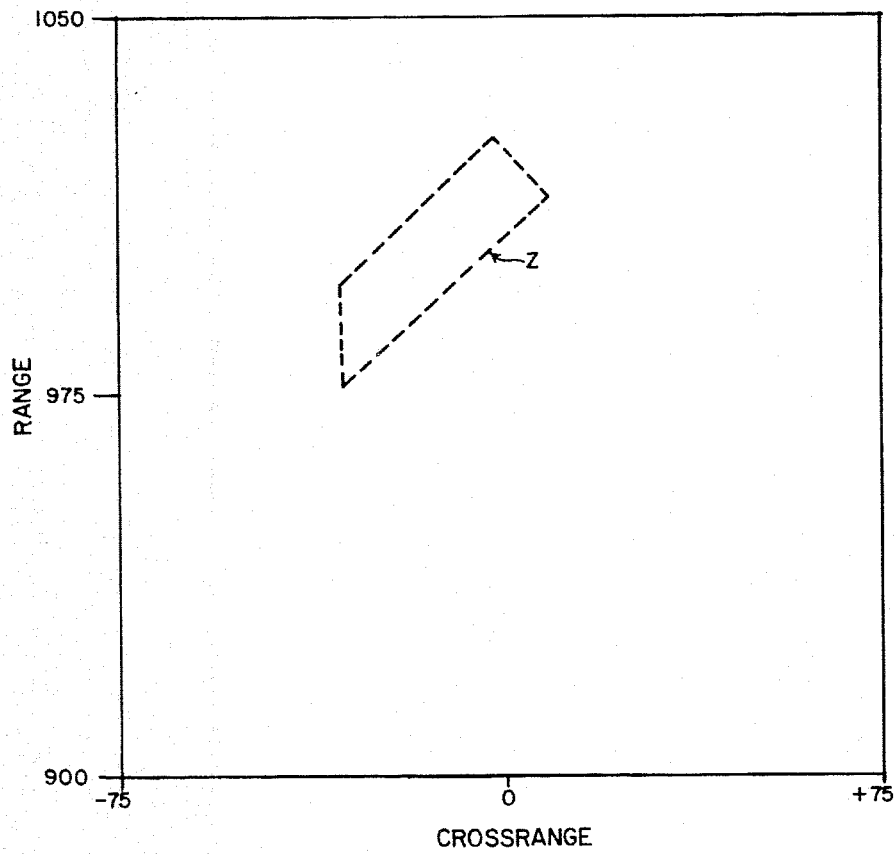

METHOD AND APPARATUS FOR TARGET IMAGING WITH SIDELOOKING SONAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to sonar systems, and more particularly to a method and apparatus for imaging underwater targets by utilizing sidelooking sonar.

In a forward looking sonar, targets give no appreciable doppler information; imaging may be done at close range using beam steering information. In a sidelooking sonar, differences in azimuthal position of target highlights map into differences in doppler shift, allowing determination of both range and crossrange information.

One method of imaging using a sidelooking sonar involves transmission of a signal with a large time-bandwidth product to achieve good range and crossrange resolution simultaneously. Extensive calculation is required to compute a two-dimensional range doppler map, as well as to process the resulting image. Also, such wideband signals invites violation of the narrowband assumptions of the underlying scattering function theory.

An alternate method is to transmit a set of subpulses and compare how well their respective ambiguity functions match the target's scattering function; this method works only for line targets consisting of a dense collection of uniform-strength scatterers.

SUMMARY OF THE INVENTION

Accordingly, one object of this invention is to form images of underwater targets in order to recognize them according to size, shade, and orientation.

Another object of this invention is to utilize sidelooking sonar techniques to perform such target imaging.

Another object of this invention is to utilize the doppler effect of sidelooking sonar to determine a polygonal approximation of a target's outline.

Yet another object of this invention is to reduce the calculation time necessary to compute a two-dimensional range doppler map from the sidelooking sonar return signals.

A further object of this invention is to utilize a single pulse sidelooking sonar to obtain an image of a target without violating the narrowband assumptions of scattering function theory.

A still further object of this invention is to extract information from a calculated target image to obtain target size, shape, and orientation.

A still further object of this invention is to obtain images of underwater targets whose highlight strengths are nonuniform.

The above and other objects are realized in a sidelooking sonar processing scheme which works as follows. When a target is detected, its range and azimuth are used to compute an optimal signal comprising a sequence of subpulse envelopes. These subpulses are put into different frequency bands, concatenated, and transmitted. The echo return is match filtered against each of the subpulses, with suitable time delays, yielding range-doppler maps. These maps are normalized, thresholded, and intersected. The points above the thresholds for all the maps can be used to form a target image.

The match filtered output is calculated along a particular linear cross-section of each map ("projections"), reducing the computational complexity to n points from the $n^2$ points required on an n-by-n range-doppler map. From the cross sections, the target extent along various directions can be deduced, and a polygonal approximation to the target outline constructed. Several algorithms are known for processing this outline to obtain information about a target size, shape, and orientation.

Other objects, advantages and novel features of the invention will become apparent from the detailed description of the invention which follows the accompanying drawings wherein:

BRIEF DESCRIPTION OF THE DRAWINGS

FIGS. 4A–4D are range-doppler maps of a target consisting of 20 randomized highlights each map representing the response to one of four different sonar signals;

FIGS. 5A–5D are crossectional profiles of the target highlights computed along the dashed lines A—A in the range-doppler maps of FIGS. 4A–4D respectively;

FIG. 6 shows a target outline computed from the range-doppler profiles shown in FIGS. 5A–5D.

DETAILED DESCRIPTION OF THE INVENTION

Figure 1:
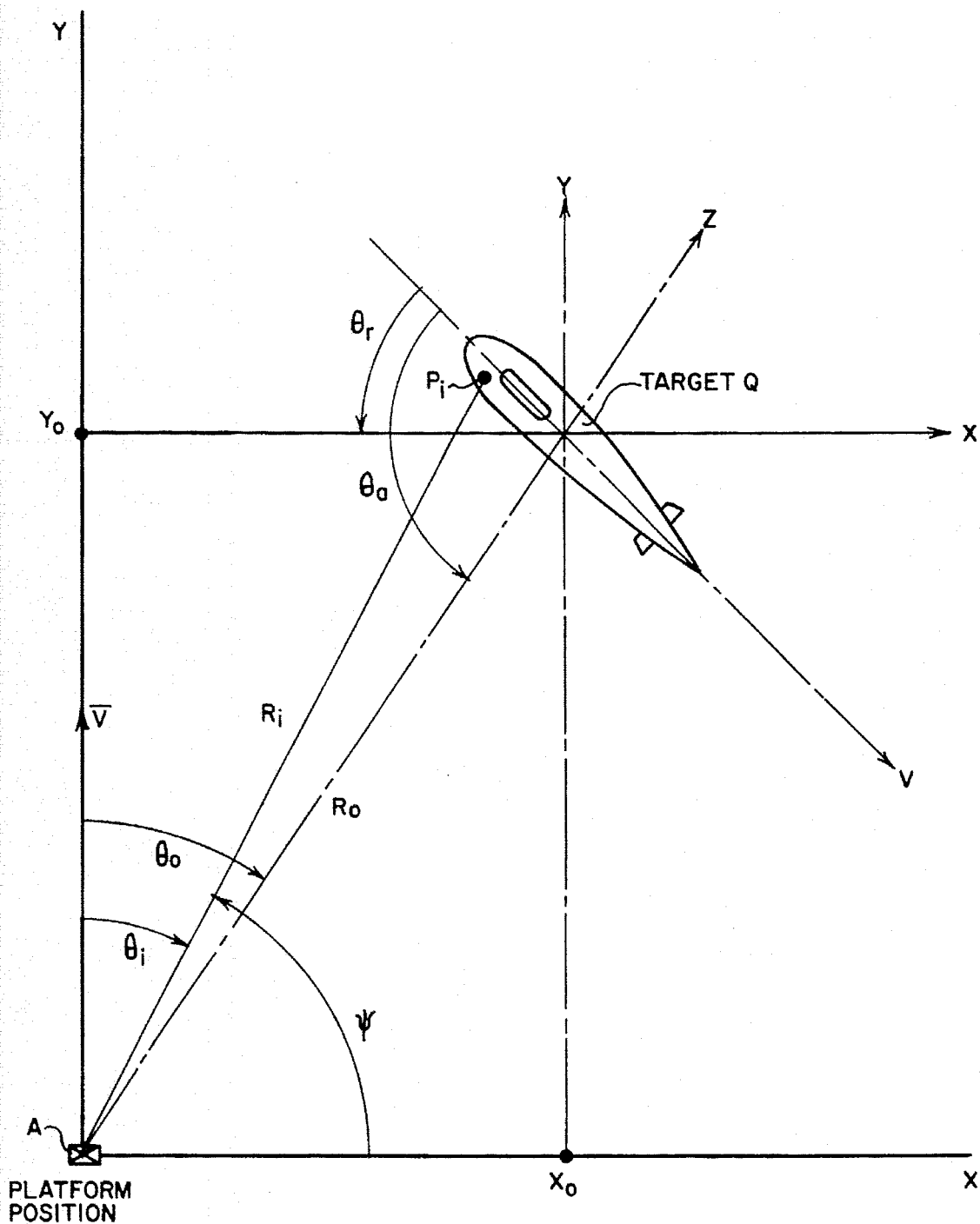
FIG. 1 shows a target Q in a coordinate system whose origin is at the position of a sidelooking sonar platform A.

Referring now to FIG. 1 there is shown a sonar platform A traveling with velocity $\bar{v}$ and a stationary point scatterer or target Q centered at range $R_o$ from the platform at bearing angle $\theta_o$, where $\theta_o$, is measured from the vector $\bar{v}$. To simplify the discussion, assume scatterer and platform are confined to the same plane of constant depth. At time t=0, the platform transmits a signal x which is a function of t, i.e., x(t), with carrier frequency $f_o$, bandwidth B, and duration T. This signal will be reflected by the scatterer and received as the echo signal r, also a function of t, i.e., $$r(t)=\alpha x(s(t-\tau)), \qquad (1)$$

where $\alpha$ is the scatterer's strength, s is the time stretch, and $\tau$ the time delay. $\alpha$ may vary with geometry but it will be assumed here to be essentially constant in the frequency band $f_o$=−B/2 to +B/2 over time duration T. For v=|v̄| where |v̄| is much smaller than c, the speed of sound, s and $\tau$ are given by $$s = 1 + \frac{2v}{c} \cos\theta \qquad (2)$$

$$\tau = 2R/c \qquad (3)$$

For $B \ll f_o$ $$\left(\text{or more strictly } \frac{1}{TB} > \frac{2v}{c}\right)$$

the signal can be considered narrowband and instead of s (time stretch), the Doppler shift $\phi$ can be used $$\phi = (s-1)f_o \qquad (4)$$

$$\phi = \frac{2v}{c} f_o \cos\theta \qquad (5)$$

Equations (3) and (5) define a mapping between $(\tau,\phi)$ space and physical space $(R,\theta)$.

Again referring to FIG. 1, the target Q occupies the region centered at $(R_o, \theta_o)$. If the target is modeled as some collection of point scatterers, $P_i$, distributed through the target region at positions $(R_i,\theta_i)$ with strengths $\alpha_i$, then r(t) is the sum of the echoes from the $P_i$. Writing $\theta$ as $\theta_o - \Delta\theta$, (5) becomes $$\phi = \frac{2v}{c} f_o \cos(\theta_o - \Delta\theta) \qquad (6)$$

$$= \frac{2v}{c} f_o [\cos\theta_o \cos\Delta\theta + \sin\theta_o \sin\Delta\theta] \qquad (7)$$

$$= \frac{2f_o}{c} [v_r \cos\Delta\theta + v_t \sin\Delta\theta] \qquad (8)$$

where $v_r = v \cos\theta_o$, the radial velocity of the target relative to the platform, and $v_t = v \sin\theta_o$, the transverse velocity component between the target and platform.

For $R_o$ large compared with the size of the target region $\Delta\theta$ is small; hence, $\cos\Delta\theta$ approximately equals 1 and the term $v_r \cos\Delta\theta$ approximately equals $v_r$ which represents a constant Doppler shift. This will be ignored at present, since the major concern is with differential Doppler shifts. The resulting expression is then $$\phi = \frac{2v_t}{c} f_o \sin\Delta\theta \qquad (9)$$

$$= \frac{2v_t}{c} f_o \cos(90° - \Delta\theta) \qquad (10)$$

which is Equation (5) for a modified geometry of platform speed $v_t$ and target angle 90°.

Converting from polar coordinates to Cartesian coordinates, with the x-axis lying along the platform velocity vector, gives the relations $$\tau = \frac{2}{c}(\sqrt{x^2+y^2}) \qquad (11)$$

$$\phi = \frac{2v_t}{c} f_o \frac{x}{\sqrt{x^2+y^2}} \qquad (12)$$

Under the previous assumption of $R_o$ large compared to the dimensions of the target Q, x is small and y is on the order of R. The above can be approximated as $$\tau = \frac{2}{c} y \qquad (13)$$

$$\phi = \frac{2v_t}{c} f_o \frac{x}{R_o} \qquad (14)$$

which is a linear mapping between physical space in the region about $(R_o, \theta_o = 90°)$ and $(\tau,\phi)$ space. Equations (13) and (14) can be inverted to give $$y = \frac{c\tau}{2} \qquad (13')$$

$$x = \frac{\phi c R_o}{2 v_t f_o} \qquad (14')$$

$(\tau,\phi)$ space is the arena where signal processing is performed. (x,y) space is the physical region about which information is to be gathered through echolocation. The importance of Equations (13) and (14) in relating the two is that they allow one to shift the viewpoint to whichever domain is more convenient.

If one is given a complex signal x(t), its narrowband autoambiguity function is defined as:

$$A(\tau,\phi) = |\int x(t) x^*(t-\tau) \exp(-2\pi j\phi t) dt|^2 \qquad (15)$$

which is simply the correlation of a signal with a time and frequency shifted copy of itself.

If a transmitted signal x(t) has returned signal or echo r(t), one may form a matched filter by calculating $$M(\tau,\phi) = |\int r(t) x^*(t-\tau) \exp(-2\pi j\phi t) dt|^2 \qquad (16)$$

From the point of view of pattern recognition, this is simply a template-matching operation with $x(t-\tau)\exp 2\pi j\phi$ as the template.

Let the scattering process which produced r(t) from x(t) be characterized by the scattering function $S(\tau,\phi)$. Under the discrete point-scatterer model of a target, the scattering function may be considered as the image of the target highlights under the mapping of Equations (13) and (14). The expected value of the matched filter is then equal to the two dimensional convolution of the ambiguity function with the scattering function:

$$E\{M(\tau,\phi)\} = S(\tau,\phi)**A(\tau,\phi). \qquad (17)$$

$S(\tau,\phi)$ represents the object to be measured. $A(\tau,\phi)$ embodies the resolution properties of the measurement process. $M(\tau,\phi)$ is the resulting numeric value of the measurement.

The maximum of any ambiguity function is at $A(\tau=0, \phi=0)$, which is the signal energy squared. Near the origin, the level contours of the function are ellipses. For some signals such as the pure tone and the symmetric quadratic FM, the major and minor diameters of the level contours are aligned with the $\tau$ and $\phi$ axes. For a linear FM signal with modulation $\exp(jbt^2)$, the major diameter lies on the line $$\phi = \frac{b\tau}{\pi} \qquad (18)$$

where b, the sweep rate, is given by $\pi B/T$. One may define B to be greater than 0 for an upchirp and less than 0 for a downchirp.

By choosing a particular level (for example, −3dB) the resolving power of the signal may be defined in terms of where the so-called uncertainty ellipse intersects the $\tau$ and $\phi$ axes. The tau and phi resolutions $\delta\tau$ and $\delta\phi$ are $$\delta\tau \text{ is proportional to } \frac{1}{B}; \qquad (19)$$

$$\delta\phi \text{ is proportional to } \frac{1}{T}. \qquad (20)$$

Resolving power represents the ability of the signal to isolate a highlight's position or to discriminate between individual highlights.

Since $\tau$ and $\phi$ are incommensurate physical quantities (units of time and frequency, respectively), it makes sense to define resolution only in directions along these axes. However, under the mappings of Eqs. (13') and (14'), the uncertainty ellipse in $(\tau,\phi)$ space is transformed into an ellipse in the (x,y) plane. Since both x and y are measured in units of distance, it becomes meaningful to define resolution in directions other than parallel to the coordinate axes. Under this point of view, the best resolution of a signal is along the minor diameter of its uncertainty ellipse. Thus, through the proper choice of signals, one may maximize the sonar's resolving ability in any desired direction.

With respect to the family of linear FM (LFM) signals, of which the pure tone is a special case, relations (18) through (20) combined with Eqs. (13') and (14') provide a way for specifying signals with the desired properties. A long pure tone (i.e. large T) has good $\phi$-resolution; this translates to good crossrange (x) resolution. Conversely, the short pure tone (i.e. large B) gives good range (y) resolution but poor resolution in x. The LPM (linear period modulation) or hyperbolic FM signals have resolution properties similar to the short pure tone, but can be more advantageous in peak power limited situations. The LFM with non-zero sweep rate resolves best in oblique directions. For a signal of duration T and nominal bandwidth B, where b=πB/T, the ridge of the LFM is aligned along a line parallel to:

$$y = \frac{Tf_o v_t}{BR} x \quad (21)$$

Its best resolution is perpendicular to the ridge and is given by:

$$y = \frac{-BR}{Tf_o v_t} x. \quad (22)$$

In an echolocation system as described above, the signal ambiguity function is known and a realization of the matched filter output can be obtained through pinging. It is desirable to compute the scattering function since this would completely characterize the target for identification purposes. Transmitting a signal whose ambiguity function was a delta function would be invaluable in accomplishing this. Unfortunately, such a signal is impossible. However, what is possible is to transmit a signal with large bandwidth and duration to reduce the uncertainty ellipse, achieving good range and azimuth resolution simultaneously. This approach is valid as long as the duration and bandwidth do not cause a violation of the stationarity assumptions used in formulating the scattering function concept which is implicitly a narrowband construct.

Figure 2A:
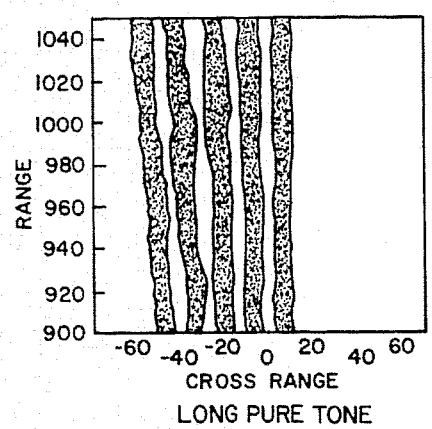
FIGS. 2A–2D are range-doppler maps of a target consisting of five highlights, each map representing the response to one of four different sonar signals.
Figure 2B:
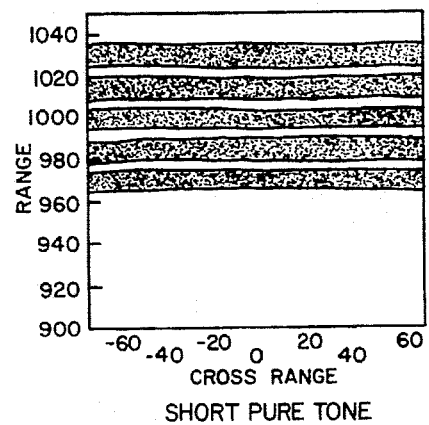
Figure 2C:
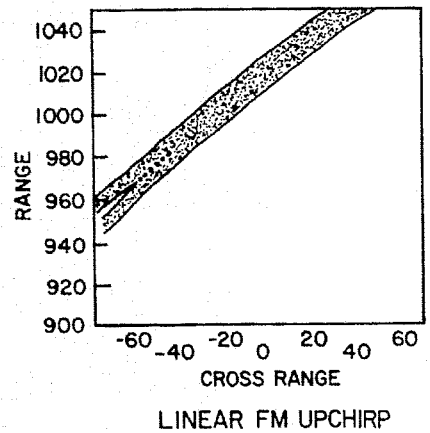
Figure 2D:
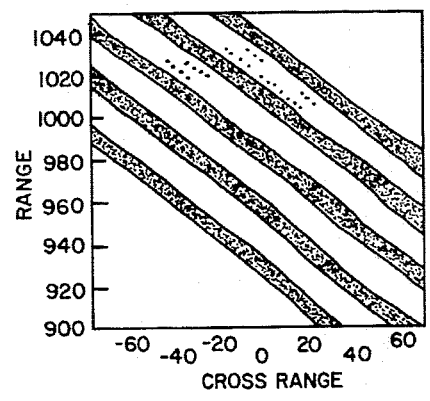
Figure 3A:
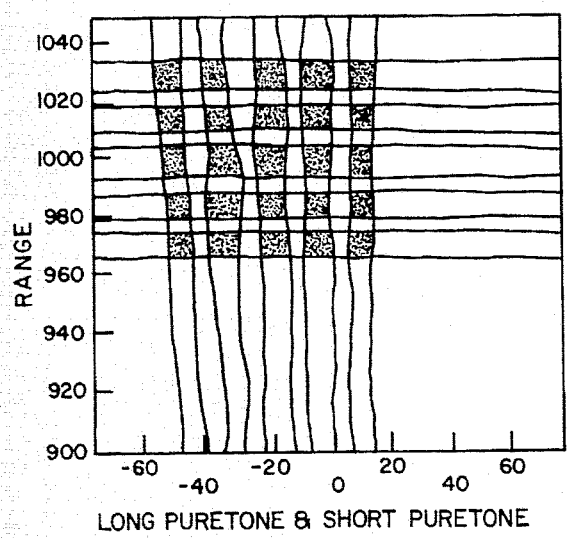
FIGS. 3A and 3B are range-doppler maps resulting from the intersection of maps shown in FIGS. 2A–2D.
Figure 3B:
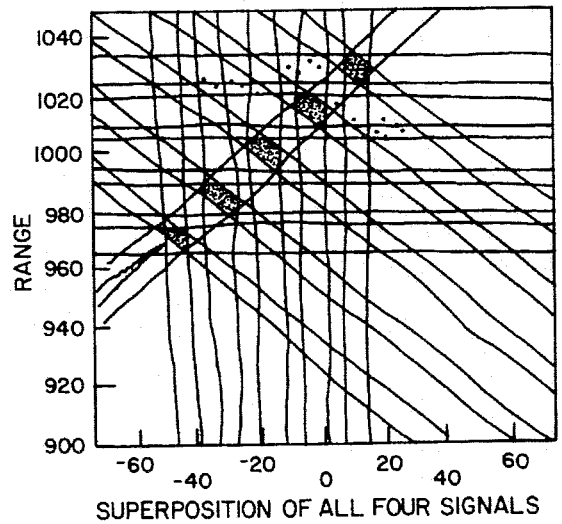

Suppose that instead of simultaneous measurement of range and doppler each quantity is measured independently. This situation can be simulated with an echo-return modeling program using a 5-highlight target at quartering aspect. The long pure tone gives no range information but does supply cross-range location as shown in FIG. 2A. The short pure tone or LPM provides accurate range information, but is indeterminate in azimuth, as shown in FIG. 2B. Combining the two localizes the target to a rectangle, as seen in FIG. 3A. The possible targets at this point are, among others, a large rectangle or a line target at either +45° or −45°. The return signals of appropriately shaped LFM signals, as shown in FIGS. 2C and 2D are used to break the tie. The intersection of all four signal returns provides sufficient information to discover target dimensions and orientation as determined by the darkened areas shown in FIG. 3B.

The above described method used four separate pings to measure the target. To implement the scheme in a real sonar, all four signals $x_i(t)$, where i=1 to 4, would be concatenated in time but each would be translated in frequency to its own carrier, $f_i$, yielding a frequency hop code. The $f_i$ are chosen to create guard bands around each subpulse large enough to reduce mutual subpulse interference during filtering to be below some $\epsilon$ where:

$$\epsilon > \max_{\substack{\tau \\ i \neq j}} |\int x_i(t) x_j^*(t-\tau) dt| \quad (23)$$

The received signal r(t) is filtered against each subpulse, suitably delayed, producing 4 range—Doppler maps.

$$M_i(\tau,\phi) = |\int r(t) x_i^*(t-\tau) \exp(-2\pi j \phi t) dt|^2 \quad (24)$$
$$i=1,4$$

It should be noted that though the signal constructed from the $x_i(t)$ has a relatively large bandwidth and duration, each individual subpulse is processed independently. The scattering function approach could thus be valid for each subpulse, even if it is not valid for the signal taken as a whole. Indeed, the scattering process could have a different appearance at each $f_i$, for example, due to frequency selective fading of various highlights. This is not too important as long as the scattering function support region (the region over which it is non-zero,) remains relatively unchanged.

A simulation of the above described method was performed utilizing a long pure tone, a linear period modulated signal, and both a linear frequency modulated upchirp and downchirp. Simulated results of such a process are shown in FIGS. 4A through 4B. The target consisted of 20 highlights of randomized position, phase, and amplitude lying about a line, at a quartering aspect to the sonar platform.

It can be seen that each figure provides information essentially in only one direction. For instance, in FIG. 4B, the line "crossrange=20" supplies the same qualitative information that the parallel line "crossrange=0" provides.

Analogous situations apply to the other figures. This suggests that a considerable amount of computation can be saved by computing the matched filters (i.e. equation 24) only along the dashed lines shown in FIGS. 4A through 4D rather than over the entire two-dimensional grid. Doing so yields the profiles $M_a$, $M_b$, $M_c$, $M_d$ of FIGS. 5A through 5D, each of which has been individually normalized to unity. Using the 0.1 (−10 dB) points of each to identify the extent of the target in the corresponding cross-section directions produces the target outline Z of FIG. 6.

The computation technique described above is an approximation to the pattern recognition technique known as projection. For example, let f(x,y) be a function in the plane, l be a line in that plane, and $\bar{p}$ be a point on the line. If we denote $1_\perp(\bar{p})$ as the line perpendicular to l thru $\bar{p}$, then the projection P along l at $\bar{p}$ is given by $$P_l(\bar{p}) = \int_{1_\perp(\bar{p})} f(x,y) \quad (25)$$

For example, $$P_{x\text{-}axis}(x_o) = \int f(x_o, y) dy \quad (26)$$

$$P_{y\text{-}axis}(y_o) = \int f(x, y_o) dx. \quad (27)$$

For 1 described by y=ax+b, $$P_l(x_o) = \int f(x, (x_o - x)/a + ax_o + b)dx \tag{28}$$

Clearly, the projections along two parallel lines are identical.

The relationship between projection and the target imaging technique of this invention is as follows. Let l be a line in (x,y), and let $A(\tau,\phi)$ be an ambiguity function with a ridge along a line perpendicular to l under the mapping of equations (13') and (14'). Let $(x_o, y_o)$ be a point on l with image $(\tau_o, \phi_o)$ under equations (13) and (14). Using the matched filter at $(\tau_o, \phi_o)$ (equation 16) as an estimate of $E[M(\tau_o, \phi_o)]$, substituting in equation (17), and using the definition of convolution gives $$M(\tau_o, \phi_o) = \int_{-\infty}^{\infty} \int_{-\infty}^{\infty} A(\tau - \tau_o, \phi_o - \phi) S(\tau, \phi) d\tau d\phi \tag{29}$$

Since it was assumed that $A(\tau,\phi)$ was of the form of a long ridge, the double integral in equation (29) is a rough approximation to integrating $S(\tau,\phi)$ along a line through $(\tau_o, \phi_o)$ parallel to the ridge-line.

In the simulation performed four projections were used. Certainly a greater (or lesser) number could be tried, subject to the constraints of bandwidth and signal duration. In addition to using the projections directly to obtain target extent information, other properties such as the projection' moments or Fourier transforms might also yield potential recognition information.

Figure 7:
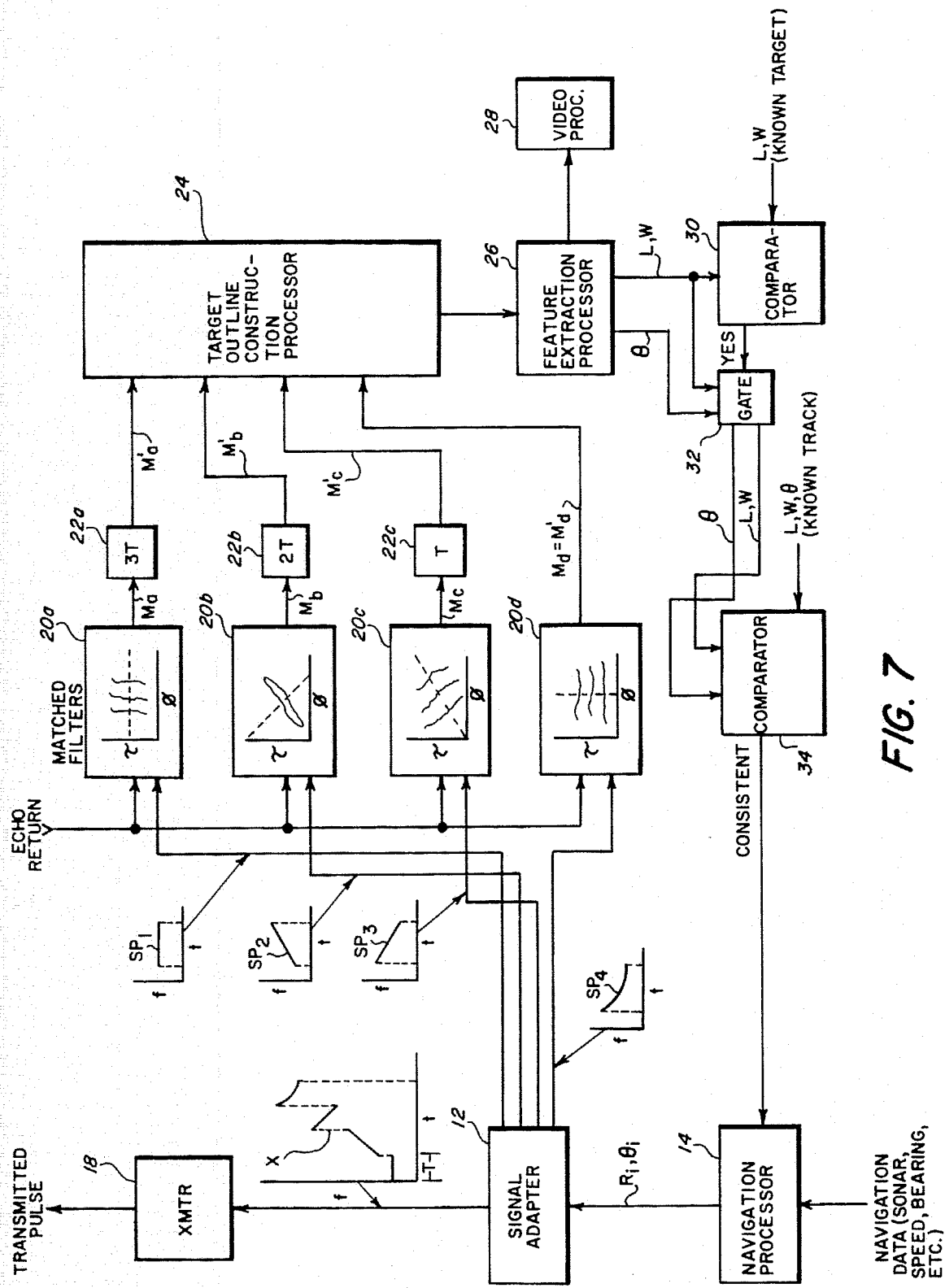
FIG. 7 shows a schematic block diagram of an embodiment of a sidelooking sonar system for implementing the method of the subject invention.

Referring now to FIG. 7 there is shown schematically a sidelooking sonar system for implementing the process according to the present invention. A signal adapter 12 receives target range $R_i$ and azimuth data $\theta_i$ from a navigation processor 14. Signal adapter 12 may be any suitable conventional signal generator capable of generating a sonar pulse consisting of a concatenated sequence of subpulses $SP_1 \ldots SP_n$ each having its own carrier frequency $f_1 \ldots f_n$. Navigation processor 14 would normally consist of a conventional type autopilot.

In the embodiment shown in FIG. 7 signal adapter 12 generates an optimized pulse X consisting of four subpulses $SP_1 \ldots SP_4$ based on the target range $R_i$ and azimuth $\theta_i$. This pulse is then propagated toward the target by a sidelooking sonar transmitter 18.

The echo return of the transmitted pulse X is match filtered against each of the original subpulses $SP_1$, $SP_2$, $SP_3$, and $SP_4$, by matched filters $20_a$, $20_b$, $20_c$, and $20_d$ respectively. The matched filters are computed using the projection methods described previously, and yield a series of range-doppler map crossections or profiles $M_a$, $M_b$, $M_c$, $M_d$, such as shown in FIGS. 5A–5D. The filtered outputs $M_a$, $M_b$, and $M_c$, are time delayed from $M_d$ for appropriate periods 3T, 2T and T, respectively by time delay circuits 22a, 22b, and 22c. The outputs of the time delay circuits 22a–22c and matched filter $20_d$ are a series of time coincident data signals $M'_a$, $M'_b$, $M'_c$, and $M'_d$ which are the inputs to a target outline construction processor (TOCP) 24.

The TOCP 24 may be a general purpose computer or a special purpose microprocessor programmed to normalize, threshold and intersect the range-doppler profiles represented by $M'_a$–$M'_d$. The TOCP 24 would also be programmed to select appropriate data points above the threshold level C (FIGS. 5A–5D) of the intersected profiles and compute a polygonal approximation of the target outline, such as that shown in FIG. 6.

The target outline Z computed by TOCP 24 can be input to a feature extraction processor (FEP) 26 as numerical data. FEP 26 may be a separate special purpose microprocessor or the same general purpose computer as TOCP 24, but programmed to compute the length, width, orientation, or some other feature of the target from the numerical data output of TOCP 24.

There are a number of feature extraction algorithms which may be programmed for use in the FEP 26. Four algorithms will be presented here. In order to evaluate their behavior, consider the following model. Let the target be a rectangle of length L and width W, at some orientation $\theta$. Using the projection method to find the target extent in directions 0°, 45°, 90° and 135° (–45°) from the x-axis yields, in general, an octagon which can be characterized by vertices $v_i$, i=1 to 8. The four algorithms are described below. Each provides an estimate of L/W and $\theta$.

Algorithm 1. Minimum Bounding Rectangle (MBR)

Find the rectangle of minimum area which wholly contains the octagonal outline. L and W will be defined as the length and width of this minimum bounding rectangle, and $\theta$ will be its orientation. From the fact that the sides of the octagon are at angles 0°, 45°, 90° and 135°, the orientation of the MBR must be along one of these directions.

Algorithm 2. Greatest Internal Vector (GIV)

Define the length L and orientation $\theta$ of the octagon to be the length and angle of the longest line segment containable within the interior of the figure. This will be the segment $\overline{v_i v_j}$ such that $|v_i v_j|$ is maximized. Let $d_i$ be the distance of $v_i$ from this line. Let width be 2 max $[d_i]$.

Algorithm 3. Least Normal Squared Error (LNS)

Let l be a line and $d_i$ the perpendicular distance of vertex $v_i$ from the line. If l is chosen such that $\Sigma d_i^2$ is minimized, then the orientation of the octagon is that of the resulting line, and W is defined as $$2 \cdot \max_i d_i.$$

If Pi is the projection of $v_i$ onto l, then $$L = \max_{i,j} |p_i - p_j|.$$

The calculation of the optimum l is, at present, done through numeric analysis procedures rather than by a closed form solution.

Algorithm 4. Traditional Linear Least Squares (LLS)

Fit a regression line to the data which minimizes the sum of the squared error. Here error is measured in the y-coordinate only, not as an absolute distance. Thus, the answer is dependent on the choice of a coordinate system. Letting $v_i = (x_i, y_i)$, the regression line y=ax+b is defined by:

$$a = \frac{n(\Sigma x_i y_i) - (\Sigma x_i)(\Sigma y_i)}{n(\Sigma x_i^2) - (\Sigma x_i)^2} \tag{30}$$

$$b = \frac{(\Sigma x_i^2)(\Sigma y_i) - (\Sigma x_i y_i)(\Sigma x_i)}{n(\Sigma x_i^2) - (\Sigma x_i)^2} \tag{31}$$

where summation is taken from 1 to 8. Once the regression line is obtained the length, width and orientation can be computed as in the LNS method. For target orientations near 90°, this method breaks down and attempts to assign a line of slope 0. This can be detected by checking to see if L<W.

The output of the FEP 26 may be utilized in either of two fashions. For example, in a system utilizing human interface the feature extraction data may be input to a video processor 28 whereby visual images of the target may be displayed for observation.

Alternatively, the feature data may be used in a closed loop detection and homing or tracking system. For example, as shown in FIG. 7 length and width information may be automatically compared with known target features either to discern a certain target or to assure that the present target is the desired target. This could be accomplished by a target feature comparator (TFC) 30. TFC 30 may be an appropriately programmed special or general purpose processor. If the comparison is favorable then TFC 30 would enable gate circuit 32 to transmit data concerning L, W, and θ.

The combination of target length, width, and orientation data could be utilized to automatically compare a known target's track in order to determine the presence of acoustic countermeasures (ACM), or to aid in navigation for homing-in on a target. This could be accomplished by a target track comparator (TTC) 34. TTC 34 like the TFC 30 may be an appropriately programmed special or general purpose processor. Output of TTC 34 would provide a signal to the Navigation Processor 14 to aid in steering and speed control.

Some of the many advantages and features of the above-disclosed invention should now be apparent in view of the foregoing description. For example, a method and apparatus have been described for detecting and discerning underwater targets according to their length, width, and orientation. Also, a method has been described for computing a polygonal approximation to a detected target by use of sidelooking sonar techniques. Furthermore, the method described saves computation time by reducing the number of information points which must be calculated. The techniques described also comply with the narrowband assumptions of scattering function theory by utilizing a concatenated sequence of narrowband subpulses to obtain information in several directions about the observed target.

Numerous additional modifications and variations of the subject invention are possible in light of the above teachings. It is therefore to be understood that within the scope of the appended claims, the invention may be practiced otherwise than as specifically described herein.

What is claimed is:

1. A method for imaging an extended target in a sidelooking sonar system comprising the steps of:

detecting a target's range and azimuth;

generating a concatenated sequence of sonar subpulses based on the target's range and azimuth;

transmitting the concatenated sequence of subpulses in a frequency hop code;

receiving the echo of the concatenated sequence of subpulses reflected from the target;

electronically computing range-doppler maps from the echoes for each of the subpulses; and numerically constructing an image of the target outline from the range-doppler maps.

2. A method as recited in claim 1 wherein the steps of computing range-doppler maps comprises the steps of:

processing the echo of the concatenated sequence through a series of matched filters to produce filtered outputs; and delaying each of the filtered outputs by an appropriate time period to produce a time coincident output.

3. A method as recited in claim 2 wherein the step of processing the echo signal through the matched filters comprises the step of electronically computing a projection of the filtered output along a particular linear cross-section of the range doppler map for each subpulse.

4. A method as recited in claim 3 wherein the sequence of subpulses comprises a long pure tone, a linear frequency modulated upchirp, a linear frequency modulated downchirp, and a linear period modulated pulse.

5. A method as recited in claim 4 wherein the step of numerically constructing an image of the target outline comprises the steps of:

normalizing the range-doppler maps;

thresholding the normalized range-doppler maps;

intersecting the thresholded range-doppler maps;

selecting data points of the intersected range-doppler maps above the threshold level; and computing a polygonal approximation of the target outline from the selected data points.

6. A method as recited in claim 5 further comprising the step of computing the target length, width, and orientation from the polygonal approximation of the target outline.

7. A method as recited in claim 6 wherein the step of computing the target length, width and orientation comprises the step of executing a feature extraction algorithm in an electronic computer using data points from the polygonal approximation.

8. In an underwater vessel having a sidelooking sonar system, apparatus for identifying and tracking a target comprising:

means for transmitting an optimized sequence of sonar subpulses toward the target;

means for receiving the echo of the subpulse sequence from the target;

first electronic means for computing projections of range-doppler maps from matched filtered signals of the subpulse sequence echo;

second electronic means for numerically constructing an image of the target from the projections by normalizing, thresholding, and intersecting the projections;

third electronic means for computing the length, width, and orientation of the target from the numerically constructed target image;

first comparator means for comparing the computed length and width of the target to the known length and width of the target, said first comparator means providing an enabling signal when the computed target features are consistent with the known target features;

gating means for transmitting the computed length, width, and orientation information when an enabling signal is received from the first comparator means; and second comparator means for comparing the length, width, and orientation of the target with the length, width, and orientation of the target based on a known track, said second comparator means providing a data signal to a navigation processor whereby the underwater vessel may continuously track and home-in on the target.

9. In a sidelooking sonar system, apparatus for imaging an extended target comprising:

means for transmitting an optimized sequence of sonar subpulses, said transmitting means further comprising means for determining the target's range and azimuth, means for generating a concatenated sequence of sonar subpulses based on the target's range and azimuth, and means for propagating the concatenated sequence of sonar subpulses in a frequency hop code toward the target;

means for receiving the echo of the subpulse sequence;

first electronic means for computing range-doppler maps from the echo; and second electronic means for numerically constructing an image of the target from the range-doppler map.

10. Apparatus as recited in claim 9 wherein the first electronic means comprises:

means for processing the echo of the concatenated sequence of sonar subpulses through a series of matched filters to produce a series of filtered outputs; and means for time delaying each of the filtered outputs by an appropriate time period to produce a time coincident output.

11. Apparatus as recited in claim 9 further comprising third electronic means for computing the target's length, width and orientation from the numerically constructed target image.

* * * * *